(12) United States Patent
Rohwer et al.

(10) Patent No.: US 7,220,513 B2
(45) Date of Patent: May 22, 2007

(54) BALANCED HUMIDIFICATION IN FUEL CELL PROTON EXCHANGE MEMBRANES

(75) Inventors: Thorsten Rohwer, Trebur (DE); Thorsten Kels, Highett (AU)

(73) Assignee: General Motors Corporation, Detroit, MI (US)

( * ) Notice: Subject to any disclaimer, the term of this patent is extended or adjusted under 35 U.S.C. 154(b) by 331 days.

(21) Appl. No.: 10/803,614

(22) Filed: Mar. 18, 2004

(65) Prior Publication Data

US 2005/0208366 A1    Sep. 22, 2005

(51) Int. Cl.
    *H01M 8/04* (2006.01)
(52) U.S. Cl. .............................. 429/39; 429/38; 429/34
(58) Field of Classification Search ............ 429/12–46, 429/34–39
    See application file for complete search history.

(56) References Cited

U.S. PATENT DOCUMENTS

| | | | |
|---|---|---|---|
| 4,038,463 A | | 7/1977 | Lamarine et al. |
| 4,931,168 A | | 6/1990 | Wantanabe et al. |
| 5,350,643 A | * | 9/1994 | Imahashi et al. ............. 429/33 |
| 5,998,058 A | | 12/1999 | Fredley |
| 6,024,848 A | | 2/2000 | Dufner et al. |
| 6,083,638 A | | 7/2000 | Taniguchi et al. |
| 6,150,049 A | * | 11/2000 | Nelson et al. ................ 429/39 |
| 6,350,539 B1 | | 2/2002 | Wood, III et al. |
| 6,365,293 B1 | | 4/2002 | Isono et al. |
| 6,379,827 B1 | * | 4/2002 | Cipollini ....................... 429/13 |
| 6,444,347 B1 | * | 9/2002 | Ouvry et al. ................. 429/44 |
| 6,660,423 B2 | * | 12/2003 | Neutzler et al. .............. 429/38 |
| 2003/0031909 A1 | * | 2/2003 | Gascoyne et al. ............. 429/30 |
| 2004/0086775 A1 | * | 5/2004 | Lloyd et al. ................... 429/44 |
| 2005/0084742 A1 | * | 4/2005 | Angelopoulos et al. ........ 429/44 |

FOREIGN PATENT DOCUMENTS

EP    0 846 347 B1    6/2000

OTHER PUBLICATIONS

Jude O. Iroh and Greg A. Wood, Control of Carbon Fiber-Polypyrrole Interphases by Aqueous Electrochemical Process, 1998, Composites Part B 29B 181-188.

* cited by examiner

Primary Examiner—Susy Tsang-Foster
Assistant Examiner—Alix Echelmeyer
(74) Attorney, Agent, or Firm—Harness, Dickey & Pierce, P.L.C.

(57) ABSTRACT

A fuel cell with a gas diffusion media having a hydrophobic layer adjacent a flow field plate and a hydrophilic layer adjacent the membrane electrode assembly of the fuel cell. The two layers enable balanced humidification of reactant gas along with a basis for managing capillary water addition into the gas diffusion media. The combination of balanced moisture flux (via the hydrophobic layer) and the retention of water (via the hydrophilic layer) for humidifying reactant gas sustains hydration of the proton exchange membrane while preserving the catalyst at full activity.

23 Claims, 7 Drawing Sheets

Schematic of distribution of even hydrophobicity and even hydrophilicity over gas diffusion media leading to non-optimal water management.

Figure 7

Schematic of distribution of hydrophobicity and hydrophilicity over gas diffusion media per the invention to optimize water management.

BALANCED HUMIDIFICATION IN FUEL CELL PROTON EXCHANGE MEMBRANES

FIELD OF THE INVENTION

The present invention relates to humidification of a fuel cell power system, and, in particular, to an apparatus for humidifying the reactant gas feed stream to the proton exchange membrane of a fuel cell by providing balanced moisture across the interfaces between the gas diffusion and the proton exchange membrane so that the proton exchange membrane is sustained in essentially balanced hydration.

BACKGROUND OF THE INVENTION

Fuel cell power systems convert a fuel and an oxidant to electricity. One fuel cell power system type of keen interest employs use of a proton exchange membrane or PEM to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells have flow fields with inlets to fluid manifolds; these collectively transport the various reactant gases flowing through each cell. Gas diffusion media or assemblies then distribute these fluids from the flow field to the reactive anode and cathode focus of a membrane electrode assembly or MEA. These gas diffusion media are frequently advantageously formed as a part of the design of primary collector electrodes pressing against the reactive anode and cathode faces.

Effective operation of a PEM requires a balanced provision of sufficient water in the polymer of a PEM to maintain its proton conductivity even as the catalyst adjacent to the PEM, the flow field, and the gas diffusion media are maintained in non-flooded operational states. In this regard, the oxidant, typically oxygen or oxygen-containing air, is supplied to the cathode where it reacts with hydrogen cations that have crossed the proton exchange membrane and electrons from an external circuit. Thus, the fuel cell generates both electricity and water through the electrochemical reaction, and the water is removed with the cathode effluent, dehydrating the PEM of the fuel cell unless the water is otherwise replaced. It is also to be noted that airflow through the cathode flow field will generally evaporate water from the proton exchange membrane at an even higher rate than the rate of water generation (with commensurate dehydration of the PEM) via reaction at the cathode.

When hydrated, the polymeric proton exchange membrane possesses "acidic" properties that provide a medium for conducting protons from the anode to the cathode of the fuel cell. However, if the proton exchange membrane is not sufficiently hydrated, the "acidic" character diminishes, with commensurate diminishment of the desired electrochemical reaction of the cell.

A problem, however, in membrane hydration occurs in operation of the fuel cell as moisture mass transfer within the cell establishes localized moisture gradients in gas diffusion media. In this regard, an imbalance within the plane of the proton exchange membrane interfacing to the gas diffusion media occurs as some areas in the plane of the membrane benefit from a higher level of moisture respective to other areas of the plane in operation. The localized imbalances in gas diffusion medium moisture quality effect comparable differentiated moisture qualities in localized areas of the proton exchange membrane resulting in differentiated efficiencies per local areas of the proton exchange membrane in generation of electricity from the cell.

Another complexity in membrane hydration is that many fuel cell catalysts are deactivated when saturated with liquid water. As a result, solutions to providing balanced hydration across the plane of the proton exchange membrane are also constrained respective to the negative impact of liquid water on the activity of the catalyst adjacent to the surfaces of the proton exchange membrane when the catalyst itself becomes hydrated to saturation with liquid water either locally or across the plane of the PEM to which the catalyst is adjacent and/or attached.

What is needed is a fuel cell power system providing comprehensively balanced hydration of the proton exchange membrane along with maintenance during operation of full activity in the catalyst attached to the surfaces of the proton exchange membrane. The present invention is directed to fulfilling this set of needs.

SUMMARY OF THE INVENTION

The present invention recognizes that it is important to understand that a number of geometric design factors of the fuel cell have a direct impact on the moisture distribution of the gas diffusion media and thus the PEM. The invention is directed to offset or at least minimize the adverse effect of geometric design requirements. The invention leads to a more balanced moisture distribution across the plane of the PEM, and moisture distribution is more balanced and controlled vertically across the PEM. The invention leads to better hydration of the PEM to maximize durability of the PEM. Accordingly, the invention is directed to a fuel cell with a gas diffusion medium having a hydrophobic layer formed on one surface in fluid communication with a flow field and a hydrophilic layer formed on an opposite surface in fluid communication with the membrane electrode assembly. The present invention further contemplates the use of repeated hydrophobic and hydrophilic layers within the gas diffusion medium.

To maximize the balance of even moisture distribution, the before mentioned hydrophobic and hydrophilic layers may not be evenly distributed over the plane of the diffusion media nor distributed evenly in a direction transverse to the plane, such as vertically through the cross section of the diffusion media. Instead, the hydrophobic and hydrophilic properties of the gas diffusion media are varied in degree or "strength" in such a way that moisture distribution is optimized over the whole plane of the gas diffusion media as well as through the cross section of the gas diffusion media.

The gas diffusion medium is a generally planar porous structure which provides a transport mechanism for reactant gas in a through-plane direction of the gas diffusion medium. The porous structure includes a hydrophobic layer formed on a surface of the porous structure which provides a transport mechanism for moisture in an in-plane direction of the gas diffusion medium. In this way, the hydrophobic layer balances moisture flux across the plane thereof and ultimately provide balance hydration of the proton exchange membrane. A hydrophilic layer formed on a surface of porous structure opposite the hydrophobic layer provides a transport mechanism for moisture in the through-plane direction of the gas diffusion medium. In this way, The hydrophilic layer functionally retains liquid water for release as humidity into the (diffusing) reactant feed as it passes through the diffusion medium to the membrane exchange assembly, preventing detrimental flow of liquid water onto the catalyst of the membrane exchange assembly even as the reactant is humidified.

Existing designs favor an even distribution of the hydrophilic and hydrophobic properties of the gas diffusion media in-plane and cross-plane, in a cross section or transverse direction in the gas diffusion media. The present invention describes an uneven distribution of the hydrophilic and hydrophobic properties in-plane as well as cross-lane in order to optimize moisture distribution and with that the electrochemical conductivity of the PEM and its durability.

The present invention may further include capillary elements in the gas diffusion medium which extend through the hydrophobic layer into the hydrophilic layer. The capillary elements delivery pressurized water into the gas diffusion medium without significant risk saturating the catalyst of membrane electrode assembly.

The combination of balanced moisture flux over and across the plane of the diffusion medium and the retention of water (via the hydrophilic layer); provided through the balanced application of the hydrophobic and hydrophilic materials in-plane and cross-plane the gas diffusion media; to fully humidify the reactant gas precludes localized drying of the proton exchange membrane by the incoming humidified reactant even as the catalyst is maintained in non-wetted condition and in full activity. Taken together, these two functional benefits provide maximized efficiency in operation of the fuel cell along with derived benefits in minimization of cross-sectional area in a fuel cell providing a defined amount of electricity and, thereby, for volume, weight, and cost reduction in a fuel cell system. In addition, the optimized humidification significantly extends durability and lifetime of the PEM.

Further areas of applicability of the present invention will become apparent from Figures and the Detailed Description Of The Preferred Embodiments provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

In overview of the preferred embodiments, the proper management of water produced in the cathodic oxidation-reduction reaction of a fuel cell is essential to efficient fuel cell operation and durability. The most desirable situation is to have full humidification of the fuel gas and oxidant gas fed to the proton exchange membrane (PEM) so that the PEM will be well hydrated and facilitate proton transfer. However, if liquid water in either stream or particle form is present in either reactant gas when the reactant contacts the catalyst attached to the proton exchange membrane, the catalyst will be deactivated to some degree and/or flooding will restrict the reactant gas from reaching catalytic sites at the membrane surface of the PEM.

Humidification of incoming reactant gases in a diffusion medium and planar migration of moisture in the same diffusion medium are two somewhat competing needs in a diffusion medium made of one material. In this regard, a particular material formed into generally planar porous structure will inherently provide a single mechanism for handling these needs. However, by providing a diffusion medium having two separate regions, such as a hydrophobic layer and a hydrophilic layer, multiple mechanisms are provided for handling the humidification and planar moisture migration needs. Indeed, the presence of a hydrophilic layer in close proximity to a hydrophobic layer further provides multiple mechanisms for humidification of feed gases. Capillary elements which add water delivery within the hydrophobic layer and hydrophilic layer further operate to provide balanced humidification of the PEM.

The present invention is further understood with reference to a generic fuel cell power system. Therefore, before further describing the invention, a general overview of the various power systems within which the improved fuel cells of the invention operate is provided. In one embodiment, a hydrocarbon fuel such as methanol, ethanol, gasoline, alkaline, or other aliphatic or aromatic hydrocarbons is processed in a fuel processor, for example, by reformation and partial oxidation processes, to produce a reformat gas which has a relatively high hydrogen content on a volume or molar basis. Therefore, reference is made to a hydrogen-containing reformat as having relatively high hydrogen content. In another embodiment, the hydrogen and/or oxygen feed streams may be provided by suitable storage means. Thus, it is to be understood that the principles embodied herein are applicable to fuel cells fueled by $H_2$ obtained from any source.

Figure 1A:
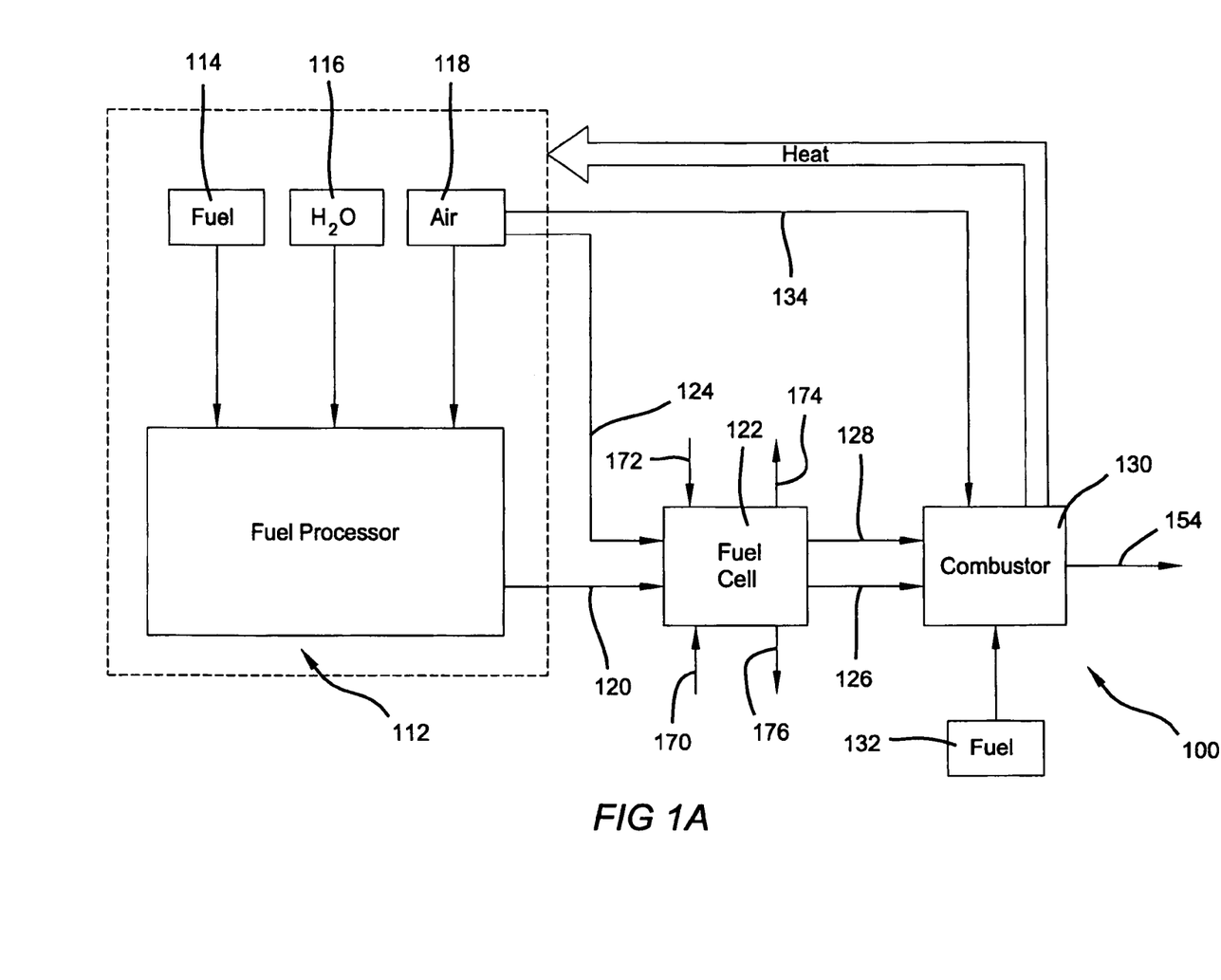
FIG. 1A shows a reformer-based fuel cell power system with water addition to the fuel cell stack of the power system.

With reference to FIG. 1A, a fuel cell power system 100 includes a fuel processor 112 for catalytically reacting a reformable hydrocarbon fuel stream 114, and water in the form of steam from a water stream 116. In some fuel processors, air is also used in a combination partial oxidation/steam reforming reaction. In this case, fuel processor 112 also receives an air stream 118. The fuel processor 112 contains one or more reactors wherein the reformable hydrocarbon fuel in stream 114 undergoes dissociation in the presence of steam in stream 116 and air in stream 118 to produce the hydrogen-containing reformat exhausted from fuel processor 112 in reformat stream 120. Fuel processor 112 typically also includes one or more downstream reactors, such as water-gas shift (WGS) and/or preferential oxidizer (PrOx) reactors that are used to reduce the level of carbon monoxide in reformat stream 120 to acceptable levels, for example, below 20 ppm. $H_2$-containing reformat 120 is fed to the anode chamber of fuel cell stack system 122. At the same time, oxygen in the form of air in stream 124 is fed into the cathode chamber of fuel cell stack system 122.

The hydrogen from reformat stream 120 and the oxygen from oxidant stream 124 react in fuel cell stack system 122 to produce electricity. A suitable cooling fluid for cooling of fuel cell stack system 122 is added via stream 172 and discharged in line 176. Water for PEM humidification in fuel cell stack system 122 is added in stream 170 and discharged in stream 174. In this regard, water in stream 170 is provided at a capillary delivery pressure, that is, a pressure which will deliver a beneficially humidifying flow of water via capillary elements embedded within gas diffusion assemblies of fuel cell stack system 122 as hereinafter described. Water in stream 170 is also provided in a purity needed to maintain delivery capillaries in unplugged operational form. The pressurization of water for stream 170 is achieved through use of a pump (not shown). Cooling fluid provided in stream 172 is provided at a pressure optimized for cooling needs within fuel cell stack system 122. In one embodiment, streams 172 and 170 are combined and provided from a water source at the same pressure.

Anode exhaust (or effluent) 126 from the anode side of fuel cell stack system 122 contains some unreacted hydrogen. Cathode exhaust (or effluent) 128 from the cathode side of fuel cell stack system 122 may contain some unreacted oxygen. These unreacted gases represent additional energy recovered in combustor 130, in the form of thermal energy, for various heat requirements within power system 100. Specifically, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 154 to the environment, and the heat generated thereby is directed to fuel processor 112 as needed.

Figure 1B:
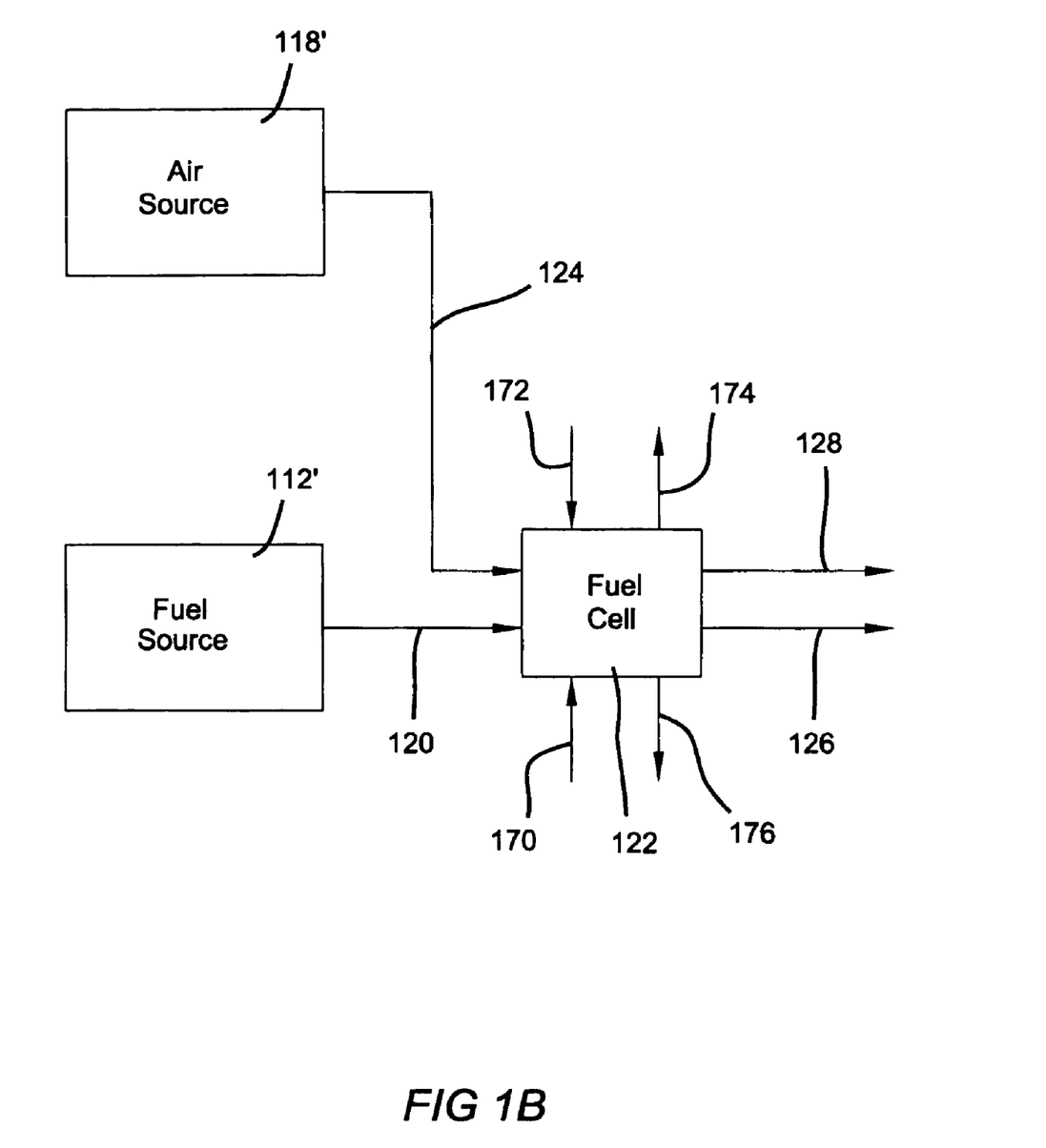
FIG. 1B shows a hydrogen storage-based fuel cell power system with water addition to the fuel cell stack of the power system.

As shown in FIG. 1B, a hydrogen feed stream 120' is provided from a suitable storage system 112' to the fuel cell 122. Likewise an oxygen feed stream 124' is provided from an air source 118'. The water supply and discharge 170, 174 for humidification and cooling fluid supply and discharge 172, 176 of fuel cell stack 122, are arranged in the manner described with reference to the fuel reforming system 100 shown in FIG. 1A. The invention is hereafter described in the context of a fuel cell fueled by an $H_2$-containing reformat regardless of the method by which such reformat is made.

Figure 2:
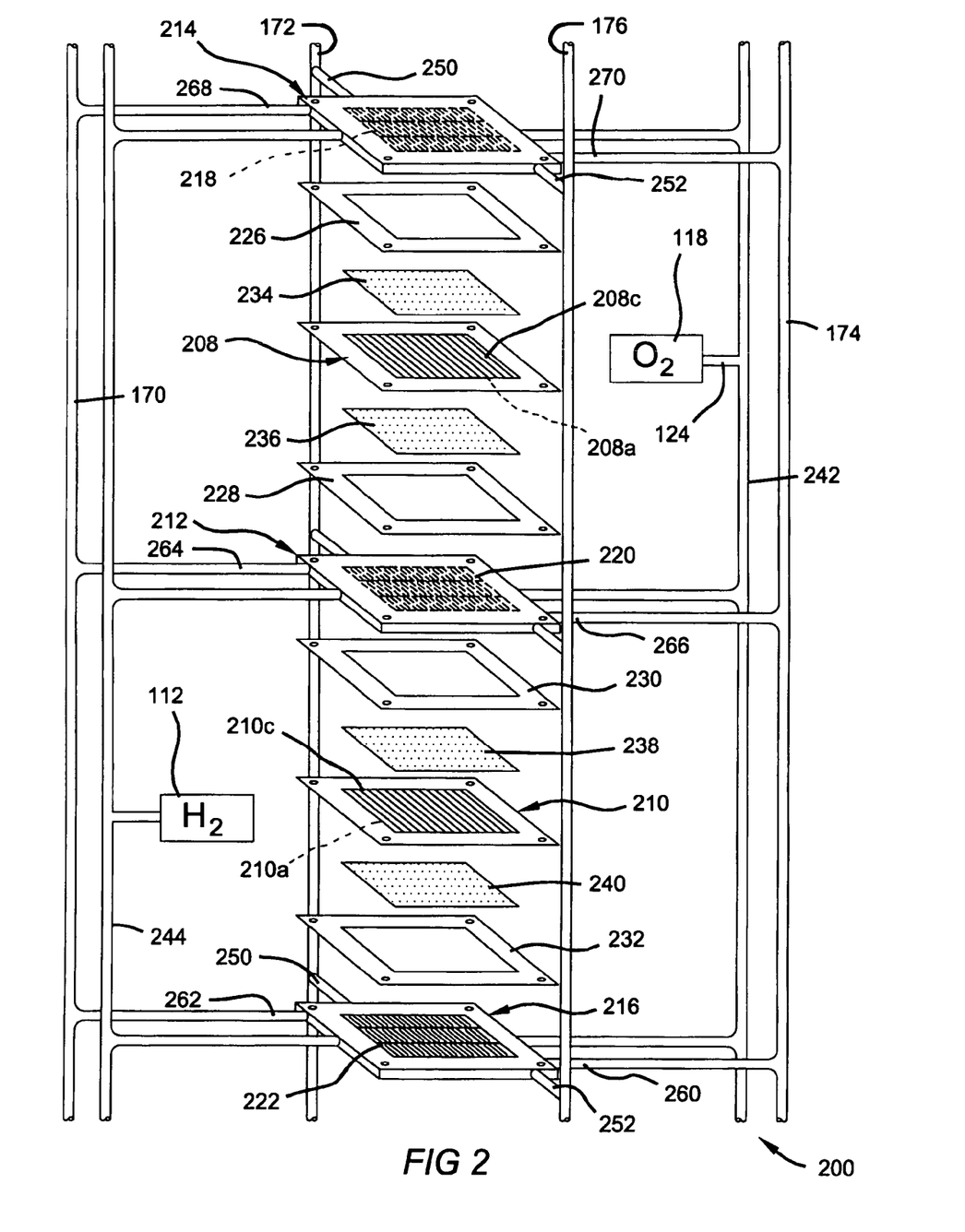
FIG. 2 shows detail in a portion of a PEM fuel cell stack within the fuel cell stack assembly of the fuel cell power system of FIGS. 1A and 1B.

Turning now to FIG. 2, a partial PEM fuel cell stack 200 of fuel cell stack system 122 is schematically depicted as having a pair of membrane electrode assemblies (MEAs) 208 and 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive, liquid-cooled end plates 214 and 216. Plates 212, 214, 216 each include respective flow fields 218, 220, 222 established in the faces of the plates for distributing reactant gases (i.e., $H_2$ & $O_2$) to the respective faces of MEAs 208, 210. Nonconductive gaskets or seals 226, 228, 230, 232 provide sealing and electrical insulation between the several plates of fuel cell stack 200.

Gas diffusion media 234, 236, 238, 240 are generally-planar porous, gas-permeable, electrically conductive sheets which press up against the electrode faces of MEAs 208, 210. Gas diffusion media 234–240 function as primary current collectors for the respective electrodes, a transport mechanism for uniformly distributing the reactant gases toward the MEA, and as mechanical support for MEAs 208, 210, especially at locations where the MEAs are otherwise unsupported in the flow field. Bipolar plate 214 presses up against gas diffusion medium 234 on cathode face 208c of MEA 208, bipolar plate 216 presses up against gas diffusion medium 240 on anode face 210a of MEA 210, and bipolar plate 212 presses up against gas diffusion medium 236 on anode face 208a of MEA 208 and against gas diffusion medium 238 on cathode face 210c of MEA 210.

As previously noted, an oxidant gas such as air/oxygen is supplied to the cathode side of fuel cell stack 200 from air source/storage tank 118, 118' and line 124 via appropriate supply plumbing 242. A fuel such as hydrogen is supplied to the anode side of fuel cell 200 from a fuel reformer 112 or 112' storage tank via appropriate supply plumbing 244. Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to bipolar plates 214, 216, as needed. Water for PEM humidification in fuel cell stack system 122 is provided from stream 170 to humidifying water inlet channels 268, 264, and 262 in end plate 214, bipolar plate 212, and end plate 222 (in other words, flow plates 214, 212, and 222) respectively and discharged from these flow plates via respective outlet channels 270, 266, and 260 to stream 174.

Figure 3:
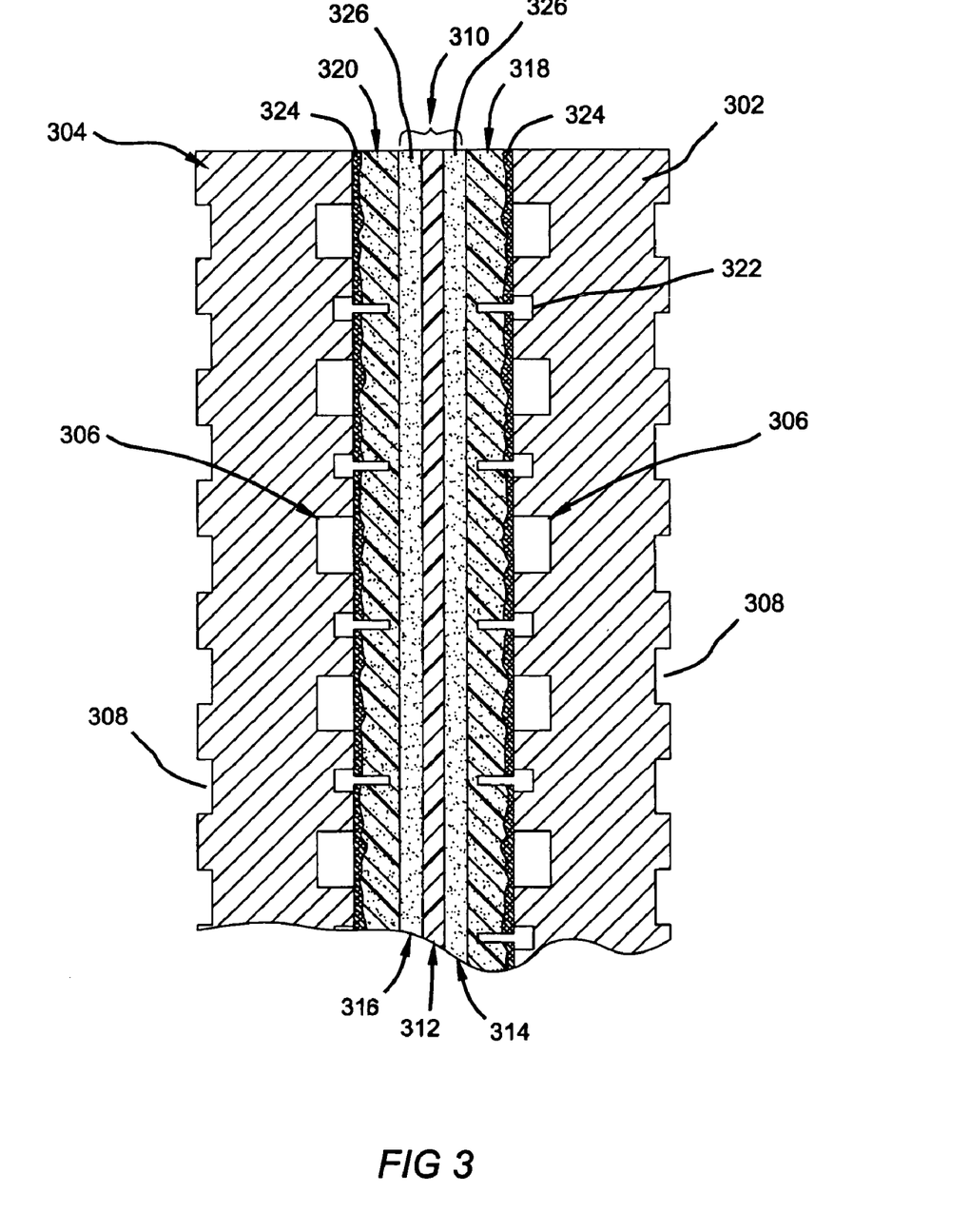
FIG. 3 shows detail in a cross-section of fuel cell having a hydrophobic layer and subsequent hydrophilic layer.

Turning now to FIG. 3, a cross-section of a portion of a fuel cell in fuel cell stack 122 is illustrated. Fuel cell 300 includes a pair of separator plates 302, 304 (commonly referred to as bipolar plates when interposed between adjacent membrane electrode assemblies). As presently preferred, each of the separator plates are of the type having a reactant gas flow field 306 formed in one face of the plate and a coolant flow field 308 formed in the opposite face of the plate. A membrane electrode assembly (MEA) 310 is interposed between separator plates 302, 304. MEA 310 includes a proton exchange membrane 312 having an anode catalyst 314 and a cathode catalyst 316 formed on opposite sides thereof and defining active areas on the MEA 310.

Gas diffusion medium 318 is interposed between anode face 314 and separator plate 302. Gas diffusion medium 320 is interposed between cathode face 316 and separator plate 304. As previously noted, proton exchange membrane (PEM) 312 in membrane electrode assembly (MEA) 310 is preferably a polymer electrolyte which enables proton exchange in the oxidation-reduction reaction of the fuel and oxidant between anode catalyst 314 and cathode catalyst 316. Coolant in flow plate coolant channel 308 cools fuel cell stack system 122. Coolant is fed to fuel cell stack system 122 from stream 172 and into flow plate coolant channels through coolant inlets such as flow plate coolant inlet 250 and discharged via coolant outlets such as flow plate coolant outlet 252 to line 176.

Fuel (for example, hydrogen) is transported into fuel cell 300 via flow field 306 defined in separator plate 302. Fuel reactant is then distributed from the anode reactant flow field 306 to anode catalyst 314 via gas diffusion medium 318.

Similarly, oxidant (for example, air) is transported into fuel cell 300 via flow field 306 defined in separator plate 304. Oxidant reactant is then distributed from the cathode reactant flow field 306 to cathode catalyst 316 via gas diffusion medium 320.

Figure 6:
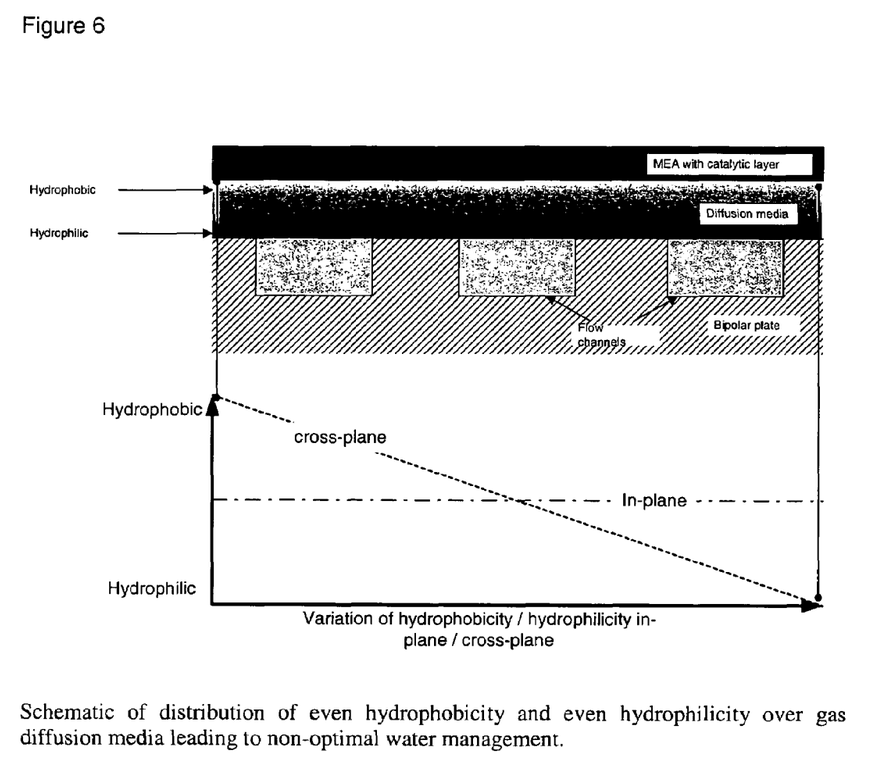
FIG. 6 depicts a schematic of distribution of even hydrophobicity and even hydrophilicity over gas diffusion media lending to non-optimal water management; and, FIG. 7 depicts a schematic of distribution of hydrophobicity and hydrophilicity over gas diffusion media per the invention to optimize water management.

As presently preferred, each of the gas diffusion media 318, 320 includes a hydrophobic layer 324 and a hydrophilic layer 326 which act together as primary current collectors (see also FIG. 6). Hydrophilic layer 326 is constructed of a relatively hydrophilic material such as carbon paper, graphite paper, graphite cloth, a fine mesh noble metal screen or an open cell noble metal foam, and the like which conducts current while providing a sufficiently porous structure to diffuse reactant gas flowing therethrough. Preferably, hydrophobic layer 324 includes a polymer having hydrophobic qualities such as polytetraflourorethylene or fluorinated polyethylene-propylene layer.

In one embodiment, the hydrophobic layer 324 may be applied as a coating (in a manner such as silk screen printing or embossment) onto a porous substrate provided by the hydrophilic layer. In this manner, the coating defines a hydrophobic stratum on the surface of the gas diffusion media 318, 320 interposed between separator plate 302, 304 and MEA 310. The coating is applied in such a manner that the gas diffusion medium maintains sufficient porosity to allow reactant gas to pass therethrough. Specifically, interstitial passages exist within the hydrophobic stratum to provide a three-dimensional webwork of polymer substantially and continuously across the general plane of the hydrophobic layer. In this way, the webwork provides a transport mechanism for moisture in the plane of the porous structure while allowing reactant gas to pass and diffuse through the porous structure. In this regard, this webwork is integral with the porous structure upon which the coating is deposited. Treatment of the initial gas diffusion media with the hydrophilic and/or hydrophobic agent is in such as way that a specific degree of hydrophilicity/hydrophobicity can be achieved at any point in-plane and cross-plane the gas diffusion media (See FIG. 7).

One area of critical moisture balance are those parts of the gas diffusion media that have direct contact with the "land areas" of the bipolar plate. Such as target area "B" of FIG. 7. The lack of direct contact to the oxidant flux through the channels of the flow field prohibits proper moistening (See FIG. 7, encirclement B).

Figure 7:
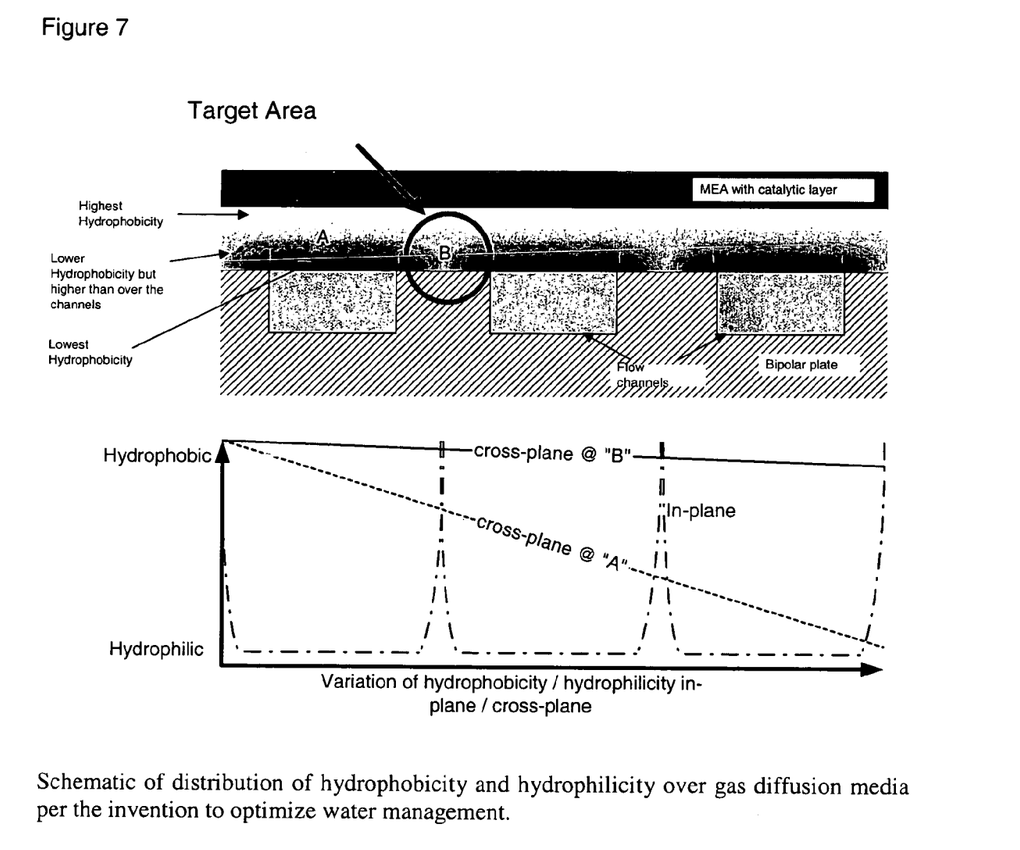

As is depicted in FIG. 7, one embodiment of the present invention is to apply hydrophobic agent in such a way in and/or on the gas diffusion media such that the hydrophobicity at the before mentioned parts that are in direct contact with the bipolar plates is significantly higher than those parts that are not in direct contact with the bipolar plates.

In another embodiment, the hydrophobic layer 324 can be a distinct lamina section which is formed separately and independently of the hydrophilic porous structure to provide a three-dimensional hydrophobic webwork of polymer. This hydrophobic lamina section is then affixed to the hydrophilic porous structure and extends substantially and continuously across the general plane thereof. In this regard, the webwork is a separate from but continuous with the hydrophilic layer.

Humidification of incoming reactant gas is achieved as each of these layers sections 324, 326 function to provide a respective reactant diffusion medium for generally moving reactant essentially perpendicular to the plane of the gas diffusion media, and also function to provide a respective medium for migration of humidity in the form of water in the plane of the gas diffusion media. In this regard, a diffusion medium of two separate regions—hydrophobic layer 324 and hydrophilic layer 326—provides multiple mechanisms for handling humidification and planar moisture balancing needs. The thickness of each of the layers and the ratio of the thicknesses, in various embodiments, represents a variable which can be adjusted independently to provide optimal performance of fuel cell 300. Another variable is realized insofar as the material of construction and/or coating which may also be adjusted independently by layer to provide optimal resolution of performance of fuel cell 300.

As previously noted, the specific application of hydrophilic and hydrophobic agents further provides a basis for even humidification of reactant gases via capillary water delivery across the interface between the separator plate 302, 304 and the diffusion media 318, 320. To this end, a capillary element 322 is formed within fuel cell 300 enabling capillary water delivery.

Accordingly, the amount of hydrophilic and hydrophobic agents applied, and with that the hydrophobicity/hydrophilicity, is not even across the diffusion media (in-plane and cross-plane). With this in mind, in specific applications, a desired distribution can be achieved. As a rule of thumb, higher hydrophobicity is desirable:

a) near the MEA catalyst layer;
b) where the bipolar plate touches the diffusion media (FIG. 7, encirclement "B"); and
c) near the cathode effluent outlet (FIGS. 1B, 128), where the most water is present.

Higher hydrophilicity is desirable:

a) near the bipolar plate
b) where the gas flux has direct contact to the diffusion media (see FIG. 7); and
c) near the cathode inlet (FIGS. 1B, 124), where water concentration is lowest.

Figure 4:
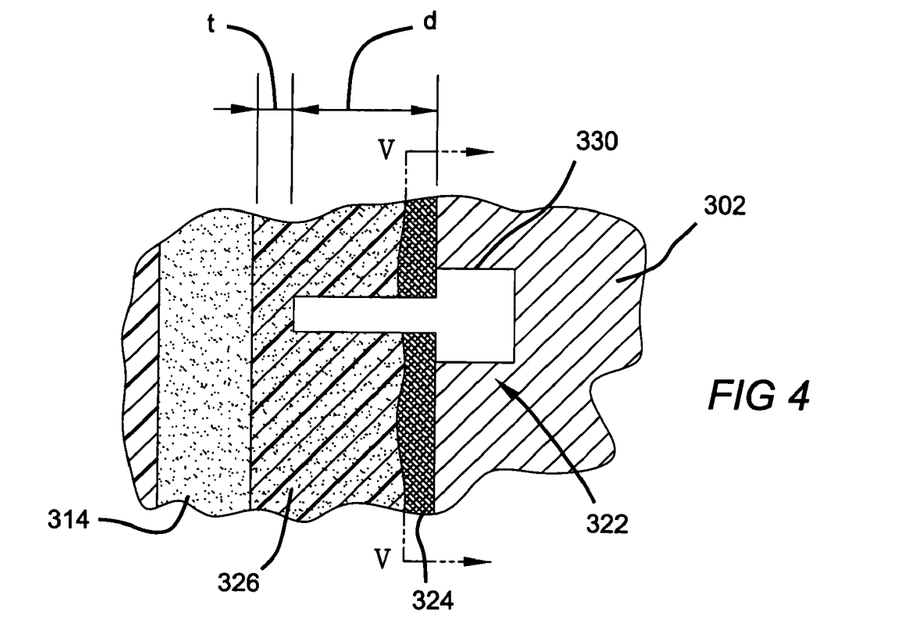
FIG. 4 shows detail of a capillary element extending through the hydrophobic layer and into the hydrophilic layer presented in FIG. 3.
Figure 5:
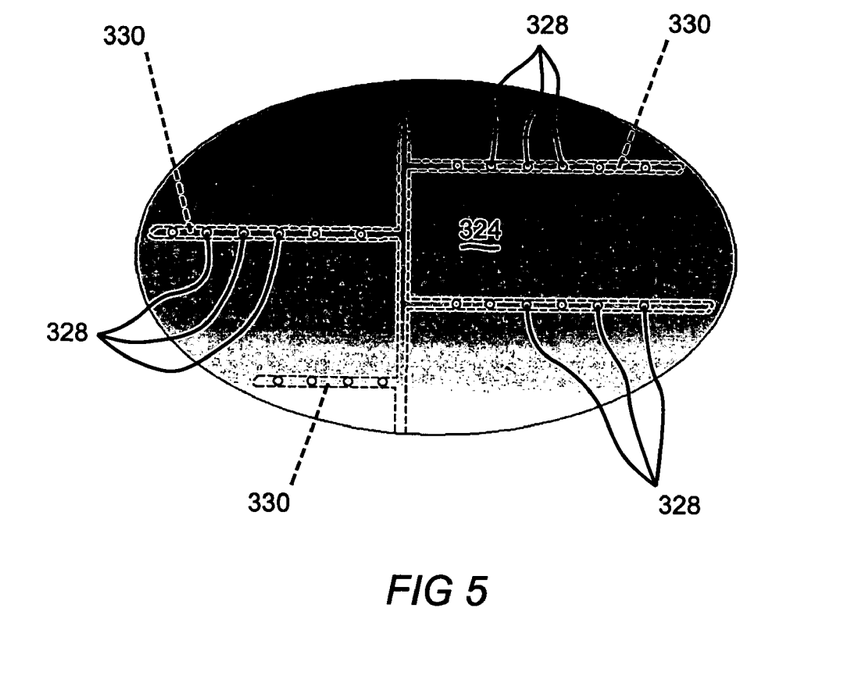
FIG. 5 depicts a planar view of the hydrophobic layer of FIGS. 3 and 4 with a conceptualized characterization of moisture flux across the planar area of the section.

With reference to FIGS. 3–5, capillary elements 322 extend into the gas diffusion media 318, 320 at the interface with the separator plates 302, 304. Specifically, each capillary elements 322 is formed as a blind bore or via 328 extending through hydrophobic layer 324 and into hydrophilic layer 326. The vias 328 are in fluid communication with water flow channels 330 formed in the adjacent face of separator plate 302, 304. Vias 328 function as capillaries through hydrophobic layer 324 to transport water from channel 330 into hydrophilic layer 326 to a depth d. In this regard, a sufficient thickness t of hydrophilic layer 326 remains such that liquid water flow is not directly provided to the face of catalyst 314, 316 in membrane electrode assembly 310. Water in water flow channels 330 is provided by a water source pressurized to an appropriate pressure for capillary delivery through vias 328 so that an appropriate of amount of water is drawn into hydrophilic layer 326.

Hydrophobic layer 324 distributes moisture across the plane thereof and ultimately provides balanced hydration of proton exchange membrane 324. Hydrophilic layer 326 retains liquid water for release as humidity into the (diffusing) reactant gas flowing therethrough to membrane exchange assembly 310, preventing detrimental flow of liquid water onto the face of catalyst 314, 316 even as the reactant gas is fully humidified. The combination of balanced moisture flux (as further discussed in reference to FIG. 5) by hydrophobic layer 324 and the retention of water by hydrophilic layer 326 to fully humidify the reactant gas precludes localized drying of proton exchange membrane 312 by incoming humidified reactant gas even as the catalyst 314, 316 is maintained in a non-wetted condition and in full activity. Taken together, these two benefits provide maximized efficiency in operation of a fuel cell along with derived benefits in minimization of cross-sectional area in the fuel cell system. Note that the "thickness" of the hydrophobic layer 324 and hydrophilic layer 326 may not be as even over the plane as depicted in FIGS. 3–5. Key part of the present invention is the specific application of hydrophobic and hydrophilic properties over the plane and cross the plane of the gas diffusion media, as depicted in FIG. 7, in order to ensure optimum humidity in-plane and cross-plane the gas diffusion media. As used herein, the terms hydrophobic and hydrophilic are relative terms and are used relative to one another. For example, FIG. 7 shows an area of lowest hydrophobicity which scales on the illustrative diagram to approach the hydrophilic.

The manner in which hydrophobic layer 324 functions to balance the in-plane moisture flux is illustrated in FIG. 5 which shows a planar view taken along the interface between the hydrophobic layer 324 and the hydrophilic layer 326. The shading of FIG. 5 (from top to bottom) illustrates a conceptualized characterization of moisture flux across this planar area. Additional water flow channels 330 may feed water to the array of vias 328. The hydrophobic nature of layer 324 enables moisture mass transfer derived from mass diffusivity transport in view of moisture concentration differences (symbolically portrayed at an exemplary instance of time in operation by varying shading density) between a relatively high moisture concentration planar region (generally indicated by the darker shading 332 at the top of the figure) and a relatively low moisture concentration planar region (generally indicated by the lighter shading 334 at the bottom of the figure). Mass transfer of moisture across the planar area of hydrophobic layer 324 thereby balances moisture flux across the plane of the gas diffusion medium and, ultimately, provides balanced hydration of proton exchange membrane 312. Differences in moisture concentration between a relatively high moisture concentration region 332 and a relatively low moisture concentration region 334 are presented as an exemplary moment of time of moisture imbalance and derive from localized differences in water addition via capillary mechanism 322, water generation in the oxidation-reduction reactions of MEA 310, and/or water evaporation into the reactant gases. It should be appreciated from the foregoing that a steady-state operation of the fuel cell incorporating the present invention will attain an essentially balanced moisture concentration over the planar area.

The description of the present invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
   a separator plate including a flow field;
   a membrane electrode assembly having an active area formed on a proton exchange membrane; and
   a gas diffusion medium interposed between said separator plate and said membrane electrode assembly such that said active area is in reactive interface with said flow field, said gas diffusion medium including:
      a hydrophobic layer formed adjacent said separator plate and in fluid communication with said flow field;
      a hydrophilic layer formed adjacent said membrane electrode assembly and in fluid communication with said membrane electrode assembly; and
      at least one capillary element extending through said hydrophobic layer and terminating inside said hydrophilic layer;
   wherein at least one of said hydrophobic layer or said hydrophilic layer is
   variable as applied across the gas diffusion medium,
   wherein a reactant gas is transported in said reactant flow field and distributed to said active area through said gas diffusion media.

2. The fuel cell of claim 1 wherein said gas diffusion media comprises a porous structure and said hydrophobic layer is defined by a region of said porous structure adjacent said separator plate having a hydrophobic coating sufficient to provide a hydrophobic stratum.

3. The fuel cell claim 2 wherein said hydrophobic coating comprises a polymer selected from the group consisting of polytetraflourorethylene and fluorinated polyethylene-propylene.

4. The fuel cell of claim 1 wherein said gas diffusions media comprises a hydrophobic lamina section defining said hydrophobic layer; and
   a hydrophilic lamina section defining said hydrophilic layer, said hydrophilic lamina section being in contact with said hydrophobic lamina section so as to provide fluid communication therebetween.

5. The fuel cell of claim 4, wherein said hydrophobic layer is variable as applied in an in-plane direction of the gas diffusion medium, providing areas of different degrees of hydrophobicity.

6. The fuel cell of claim 4 wherein said hydrophilic layer is variable as applied in an in-plane direction of the gas diffusion media, providing areas of different degrees of hydrophilicity.

7. The fuel cell of claim 4 wherein said hydrophobic layer is variable as applied in a cross-plane direction of the gas diffusion media, providing areas of different degrees of hydrophobicity across the gas diffusion media.

8. The fuel cell of claim 4 wherein said hydrophilic layer is variable as applied in a cross-plane direction of the gas diffusion media, providing areas of different degrees of hydrophobicity across the plane of the gas diffusion media.

9. The fuel cell claim 4 wherein said hydrophobic lamina section comprises a polymer selected from the group consisting of polytetraflourorethylene and fluorinated polyethylene-propylene.

10. The fuel cell of claim 1 wherein said gas diffusion media comprises a porous structure selected from the group consisting of carbon paper, carbon cloth, graphite paper, graphite cloth, mesh noble metal screen and an open-cell noble metal foam.

11. The fuel cell of claim 1, further comprising:
    a water flow channel in said separator plate, the water flow channel in fluid communication with the at least one capillary element.

12. The fuel cell of claim 11 wherein said capillary element comprises a via formed in said gas diffusion media.

13. The fuel cell of claim 12 wherein a thickness of said hydrophilic layer exists between said via and said membrane electrode assembly to prevent direct contact of water on said membrane electrode assembly.

14. The fuel cell of claim 11 further comprising a water source in fluid communication with said water flow channel to deliver water to said at least one capillary element at a capillary delivery pressure.

15. The fuel cell of claim 1 wherein said separator plate has a second flow field formed in a face opposite said flow field.

16. A gas diffusion medium for a fuel cell comprising a generally planar porous structure defining an in-plane direction and a through-plane direction, said porous structure providing a transport mechanism for reactant gas in said through-plane direction, said porous structure further including:
- a hydrophobic layer formed on a first surface of said porous structure and providing a transport mechanism in the gas diffusion media for moisture in said in-plane direction;
- a hydrophilic layer formed on a second surface of said porous structure and providing a transport mechanism in the gas diffusion media for moisture in said through-plane direction; and
- at least one capillary element extending through said hydrophobic layer and terminating inside said hydrophilic layer;
- wherein at least one of said hydrophobic layer or said hydrophilic layer is variable as applied across the gas diffusion medium.

17. The gas diffusion media of claim 16 wherein said hydrophobic layer is a stratum defined by a region of said porous structure having a hydrophobic coating.

18. The gas diffusion media of claim 17 wherein said hydrophobic coating comprises a polymer selected from the group consisting of polytetraflourorethylene and fluorinated polyethylene-propylene.

19. The gas diffusion media of claim 16 wherein said porous structure comprises a hydrophobic lamina section defining said hydrophobic layer, and a hydrophilic lamina section defining said hydrophilic layer, said hydrophilic lamina section being in contact with said hydrophobic lamina section so as to provide fluid communication therebetween.

20. The gas diffusion media of claim 19 wherein said hydrophobic lamina section comprises a polymer selected from the group consisting of polytetraflourorethylene and fluorinated polyethylene-propylene.

21. The gas diffusion media of claim 16 wherein said porous structure comprises a porous structure selected from the group consisting of carbon paper, carbon cloth, graphite paper, graphite cloth, mesh noble metal screen and an open-cell noble metal foam.

22. The gas diffusion media. of claim 16 wherein said capillary element comprises a via formed in said porous structure.

23. The gas diffusion media of claim 22 wherein a thickness of said hydrophilic layer exists between said via and said second surface to prevent water flow directly through the gas diffusion media.

* * * * *